United States Patent [19]

Hobson, Jr.

[11] Patent Number: 5,407,570
[45] Date of Patent: Apr. 18, 1995

[54] FLEXIBLE FILTER ELEMENT

[76] Inventor: Russell Hobson, Jr., Rte. 1, Box 30, Old Fort, N.C. 28762-9702

[21] Appl. No.: 164,632

[22] Filed: Dec. 7, 1993

Related U.S. Application Data

[60] Continuation of Ser. No. 917,494, Jul. 21, 1992, abandoned, which is a division of Ser. No. 750,862, Aug. 28, 1991, Pat. No. 5,230,131.

[51] Int. Cl.6 .............................................. B01D 29/17
[52] U.S. Cl. ...................................... 210/232; 210/486; 210/495; 210/497.01; 210/499; 55/379
[58] Field of Search .............. 210/323.2, 346, 452, 210/486, 495, 497.01, 497.1, 499, 232; 55/379

[56] References Cited

U.S. PATENT DOCUMENTS

| 82,255 | 0/1868 | Simmons | 210/446 |
|---|---|---|---|
| 1,489,519 | 4/1924 | Chateau | 210/437 |
| 1,741,705 | 12/1929 | Liddell | 210/443 |
| 1,935,136 | 6/1933 | Thibert | 210/89 |
| 2,014,105 | 12/1935 | Dooley | 210/446 |
| 2,067,439 | 1/1937 | Dooley | 210/164 |
| 2,145,047 | 1/1939 | Goldkamp | 55/379 |
| 2,274,352 | 2/1942 | Wood | 210/164 |
| 2,313,343 | 3/1943 | Jacob | 210/495 |
| 2,487,769 | 11/1949 | Ebert et al. | 210/497.1 |
| 3,100,190 | 8/1963 | Hobson | 210/106 |
| 3,219,072 | 11/1965 | Lau | 141/286 |
| 3,327,864 | 6/1967 | Ball et al. | 210/497.01 |
| 3,386,587 | 6/1968 | Mast et al. | 210/193 |
| 3,394,815 | 7/1968 | Harms et al. | 210/323.2 |
| 3,503,516 | 3/1970 | Harms et al. | 210/497.01 |
| 3,642,141 | 2/1972 | Hobson, Jr. | 210/323 |
| 3,750,889 | 8/1973 | Acosta | 210/497.01 |
| 3,868,325 | 2/1975 | Otto | 210/232 |
| 4,157,900 | 6/1979 | Margraf | 55/379 |
| 4,292,180 | 10/1981 | Zylka et al. | 210/496 |
| 4,340,477 | 7/1982 | Hobson, Jr. et al. | 210/241 |
| 4,872,981 | 10/1989 | Hobson, Jr. | 210/323 |
| 4,919,801 | 4/1990 | Hobson, Jr. | 210/104 |

Primary Examiner—Matthew O. Savage
Attorney, Agent, or Firm—Weingram & Zall

[57] ABSTRACT

A recyclable, flexible filter element comprising a tubular, outer braided jacket supported by a helical spring. The bottom of the tube of the jacket is turned inside the helical spring and is sealed by a removable fastening device which is inserted into the bottom of the helical spring to engage the spring through the thickness of the braided jacket. The top of the outer braided jacket is fastened and sealed to a flange and washer assembly which also contains the top of the internal support spring.

9 Claims, 7 Drawing Sheets

FLEXIBLE FILTER ELEMENT

This is a continuation of U.S. patent application Ser. No. 07/917,494, filed on Jul. 21, 1992, now abandoned, which was a divisional of U.S. patent application Ser. No. 07/750,862, filed on Aug. 28, 1991, now U.S. Pat. No. 5,230,131.

BACKGROUND OF THE INVENTION

1. Field of the Invention This invention relates, generally, to flexible tubes used for filtration and, more particularly, to flexible filter tubes which are composed of elements which can be disassembled to enable recycling of the still usable elements of the tube and, additionally, to the method of recycling such tubes.

2. Description of the Prior Art

Flexible tube filtration is a well-known and highly valued filtration technique which uses a specialized apparatus. This filtering technique-and an early apparatus for accomplishing this technique, were described in U.S. Pat. Nos. 3,100,190 and 3,642,141, both issued to Hobson, and, both of which are incorporated by reference into this application.

Developments in the flexible filter tube construction have lead to increased use of monofilament strands which are braided to form the outer jacket of the tubes, in addition to the more traditional stainless steel braiding used to form the outer jacket.

Filter tubes do not, generally, last forever. Some applications, such as the filtration of coolants for grinding of carbide tool bits, cause the filter strands to be eroded, and small holes in the-wall result. Leakage of the particles through the wall ensues, and service personnel, must correct the condition. Normally, the damaged elements are removed and discarded and new elements installed to replace them.

In order to minimize down time for the filtering apparatus due to ad hoc replacement of individual filter elements as they fail, many customers routinely replace all their tubes in accordance with a maintenance schedule. Some filters have over a thousand tubes, each of which tube contains stainless steel components such as the internal shaping spring. Yet the whole tube will be discarded, though the only part of the tube that needed replacement was the outer jacket. The springs are rarely ever damaged, and can be recycled almost without limit.

SUMMARY OF THE INVENTION

The present invention sets forth a recyclable, flexible filter element comprising a tubular, outer braided jacket supported by a helical spring. The bottom of the tube of the jacket is turned inside the helical spring and is sealed by a removable fastening device which is inserted into the bottom of the helical spring to engage the spring through the thickness of the braided jacket. The top of the outer braided jacket is fastened and sealed to a flange and washer assembly Which also contains the top of the internal support spring.

The invention also includes a method of recycling a flexible filter element comprising the steps of disassembling the sealing element and removing the internal support components of the filter element from the external jacket by disengaging a fastening means at the bottom of the tube. The external jacket can then be refurbished and used with modified internal components. Alternatively, a new external jacket can be provided and used with other existing components of the filter element when the items are reassembled. Reassembly includes positioning the internal support spring within the outer jacket tube, turning the bottom of the outer jacket tube inside the internal support spring and then engaging the fastening means with the bottom of the spring to seal the fastening means to the turned up end of the bottom of the external jacket.

The repairman can locate the damage point on one of these new tubes and disassemble the tube by unscrewing or otherwise removing the plug at the bottom. He can cut off the damaged part of the tube, cut the spring from the top down to match the new, shorter tube, and reinsert the spring and the plug. The filter can be reassembled and back in operation without undue delay. Emergency over.

Accordingly, it is an object of the present invention to provide a flexible filter element which can be recycled to reuse major components of the filter element. It is another object the present invention to provide a flexible filter element which can be repaired without substantial loss of effectiveness. It is still another object of the present invention to provide a flexible filter element which is made from components that can be effectively reused if the filter element fails or requires servicing.

Another object of the present invention is to provide flexible filter element which is fabricated from simple components which can be disassembled and reassembled at the site of use.

Yet another object of the present invention is to provide a flexible filter element which is fabricated from components which can be disassembled and reassembled without extensive or complex or expensive machinery.

A further object of the present invention is to provide a flexible filter element which is relatively inexpensive to repair or to overhaul.

Yet a further object of the present invention is to provide a flexible filter element which is fabricated in a manner to reduce the stress on the components of the filter element and thereby extend the service life of the unit.

Still a further object of the present invention is to provide a flexible filter element which is relatively durable, which is relatively economical, and which is relatively reliable.

Another object of the present invention is to provide flexible filter element which can be fabricated from relatively simple and easy to obtain components.

A further object of the present invention is to provide a flexible filter element which is simple to assemble and disassemble.

Another object of the present invention is to provide a flexible filter element in which the components include means to enable positioning of the element at both of its ends.

Still another object of the present invention is to provide a flexible filter element which enables the element to be installed in a wide range of attitudes for a wide range of applications.

Yet another object of the present invention is to provide a flexible filter element which minimizes stress concentration points or weakness in the outer jacket of the filter element.

Additionally, another object of the present invention is to provide a flexible filter element which is especially adapted for fabrication of the braided monofilament outer jacket material to maximize strength and durability of the monofilament.

Another object of the present invention is to provide a method of recycling a flexible filter element which enables the reuse of the most expensive components in the filter element.

Still another object of the present invention is to provide a method of recycling flexible filter elements which enables reuse portions of the outer jackets of the filter elements.

Yet another object of the present invention is to provide a method of recycling flexible filter elements which enables reuse of the internal components of the filter elements.

It is a further object of the present invention to provide a method of recycling flexible filter elements which can be accomplished with standard, readily accessible tools.

Yet a further object of the present invention is to provide a method of recycling flexible filter elements which can be accomplished without requiring heat or ultrasonic welding or other specialized fabricating techniques.

Yet an additional object of the present invention is to provide a method of recycling flexible filter elements which is simple to perform.

A further object of the present invention is to provide a method Of recycling flexible filter elements which requires a minimum of skill and is relatively easy to perform.

Still another object of the present invention is to provide a method of recycling flexible filter elements which can be accomplished at the location of the filter apparatus in which the filter elements are installed.

Other objects and advantages of the invention will be apparent from the following description of the invention, the novel features of which are being more particularly pointed out hereinafter in the claims.

DETAILED DESCRIPTION OF THE PREFERRED EMBODIMENT

Referring to FIGS. 1-4, a filter element generally indicated at 20 has an outer jacket 22 formed from a braid of monofilament strands. The outer jacket is in the form of a tube and, because of the braiding, may be capable of expansion in the diametrical dimension by compression in the axial direction and the converse. A helical spring generally indicated at 24, having a top portion 28 and a widely pitched helical section 26, also has a compressed portion 30 at the bottom of the spring in which the helix is tightly wound. The spring can be made of stainless steel or any other metal that will not react with the medium that is being filtered.

The bottom of the outer jacket, or lower end of the outer jacket, has a turned up portion 32 which is turned up about the compressed portion 30 of the spring 24, so that the compressed portion of the spring is between the outside of the outer jacket 22 and the turned up portion 32. The turned up portion at the bottom of the filter element extends Upward into the element, inside spring 24 to the end 38 of the tubular jacket 22. The end of the filter element is sealed by means of a sealing means in the form of a screw generally indicated at 40 having a head 42 with a slot 44 and having a shank 46 extending from the head with a shoulder 48 on the underside of the head. The shank has helical threads 50 formed to it with the top of the threads 50 forming grooves in the turned up portion 32 of the outer jacket 22. The diameter of the threads 50 is such as to be approximately the same pitch and diameter as the compressed portion of the spring, so that the screw is threaded into the threaded means defined by the helical winding 30 of spring 24 and, in effect, taps a thread for itself by deforming the grooves 52 in the turned up portion 32 of jacket 20 tube.

As the screw is advanced, it will eventually bring the shoulder 48 to bear on the outer jacket 22 at the point where it is turned inward at the end of the spring. This will effectively seal the bottom of the filter element to form a closed bottom tube. Note that this will not require any welding, ultrasonic welding or other fastening means. The dimensions of the screw used to seal a standard ½" diameter filter tube would be a standard ⅜" diameter, 16 pitch, by ¾" long stainless steel bolt. However, there are other devices that can be used as will be described later. The ⅜" diameter, 16 pitch thread, is advantageous in that if a spring wire of 0.053" diameter is wound at nearly zero spacing, the ⅜" or so of solid spring approximate a 16 pitch, or 0.063" pitch thread. Similar issues can be obtained for tubes of other diameters.

The upper portion of the filter element consists of a neck down section 34 of the outer braided jacket 22 which leads into a flange assembly generally indicated at 54 to seal and secure the top end of the tube 36 and to enable mounting of the filter tube in the appropriate apparatus manifold. The flange assembly 54 has an outer cup-shaped flange 56 which is swaged to form an overlip 58 which coacts with a flat washer 60 having an inner diameter 64 which is smaller than the diameter of the top of the helix spring 28. The outer flange 56 has a tubular entry portion 66 which then necks or bends at 62 to form the bowed out portion that accommodates the outer diameter of washer 60 and then forms the overlip 58. The inner diameter 64 of washer 60 is smaller than the diameter of the end 28 of spring 24 and, therefore, the coaction of the overlip 58 of the outer flange with the washer not only seals the end 36 of the outer jacket 22, but also restrains the spring to give form and body to the outer jacket 22.

The flange assembly is generally made from stainless steel or other material similar to the sealing means at the bottom of the tube and the internal spring.

The flange assembly has several advantages over the old method of forming a flange which it replaces. The old method formed flanges by ultrasonically melting and reforming the polyester or other thermoplastic material of which the monofilaments that were braided into the jacket were made from. The old melting procedure is highly detrimental to the tensile strength of the polyester strands. The tensile strength of the polyester monofilaments is augmented by subjecting the material to tension during the point at which the material is cooling below the "glass transition point". This causes the molecules to be oriented laterally and greatly increases the tensile strength. This is the characteristic which makes the material ideal for permanent press fabrics in that the molecules have "memory" for their physical positions relative to each other and will return to the prior positions they occupied after having been displaced by bending or other deformation. This is true, but only so long as the material has not been heated up to the glass transition point of about 400° F. in the interim. Unfortunately, the old methods of making the flange which require ultrasonic melting suffer from the effects of the heating required to form the flanges. Therefore, the flange is the weakest part of the old style tubes.

Figures 8, 9, 10:
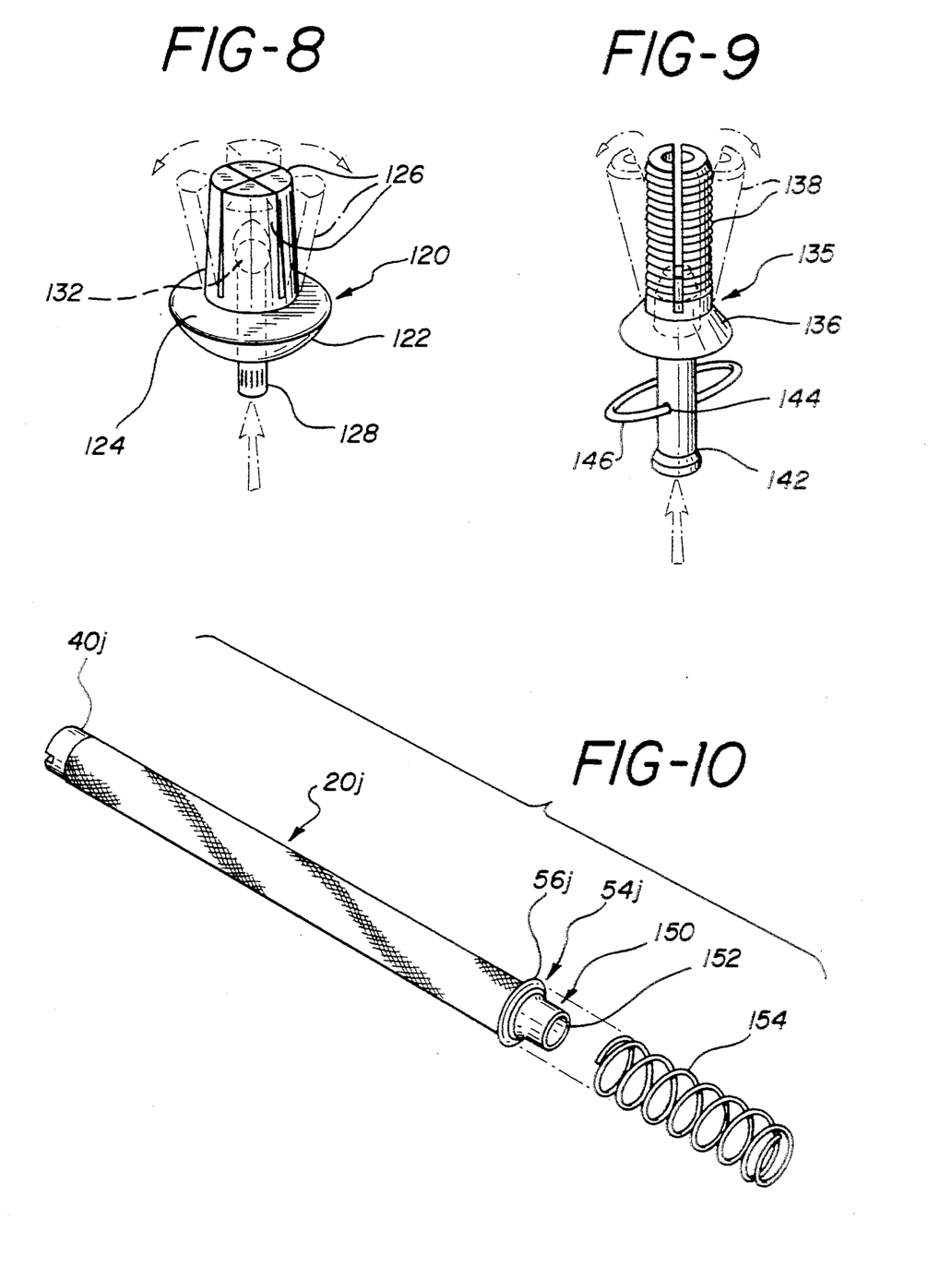
FIG. 8 shows another embodiment of a closure means for the recyclable flexible filter element.
FIG. 9 shows yet another embodiment of a closure for the recyclable flexible filter element.
FIG. 10 is an exploded view showing another embodiment of a recyclable flexible filter element having a different flange configuration and the positioning means that would be used in conjunction with the filter element.

The flange of the present invention requires no heat to form the two metal pieces into the present structure. The braided flexible tube passes between the outer flange 56 and the inner support, or flat washer 60. The flat washer can be another cup-type washer which can itself be swaged over together with the outer washer as is shown in FIG. 10. The outer piece is swaged over the braid, and the inner washer and the completed assembly demonstrates a substantial increase in durability. The design is such that, upon entering the outer washer, the braided tube makes a 90 radial degree turn outward, then a 180 back inward turn, making a total of 270 degrees of bends. These bends create an assembly that is inherently rigid, given the shape of the metal washers. It should be pointed out that the strands, themselves, do not make the 270 degree bends, but, due to their helical form, bends of other angular values.

Figure 1:
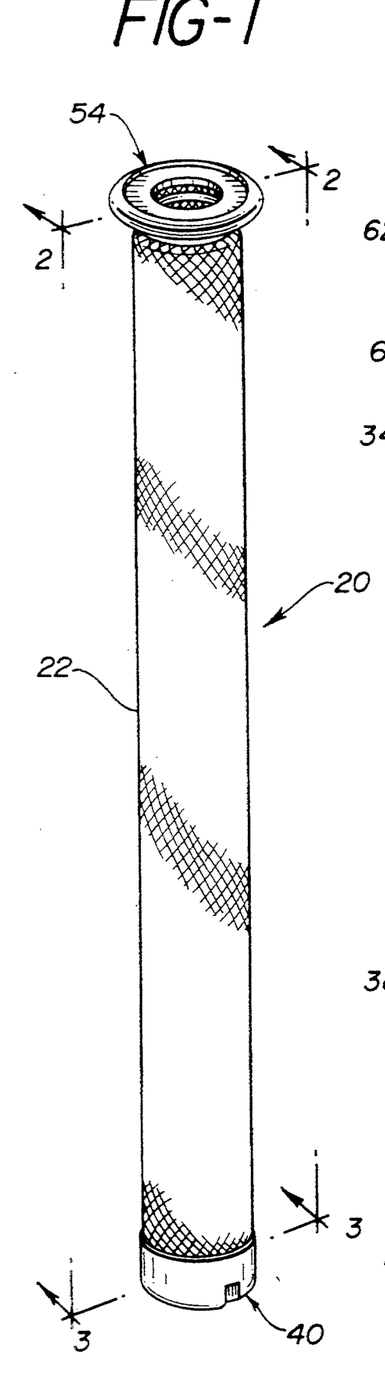
FIG. 1 is a perspective view showing a recyclable, flexible filter element incorporating the present.
Figure 2:
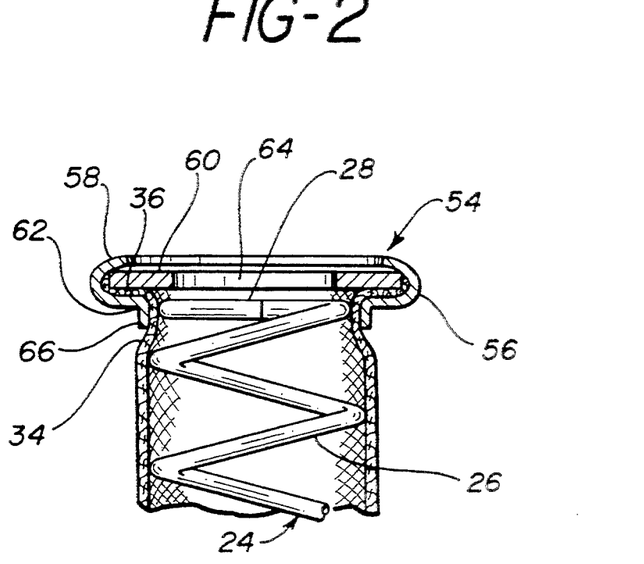
FIG. 2 is a fragmentary view taken along lines 2—2 of FIG. 1.
Figure 3:
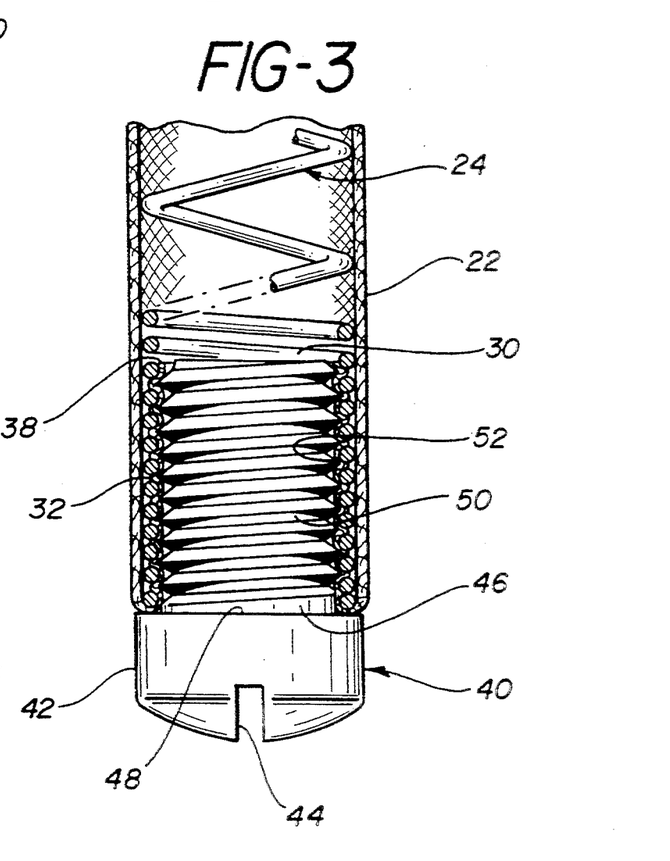
FIG. 3 is a fragmentary view taken along lines 3—3 of FIG. 1.
Figure 4:
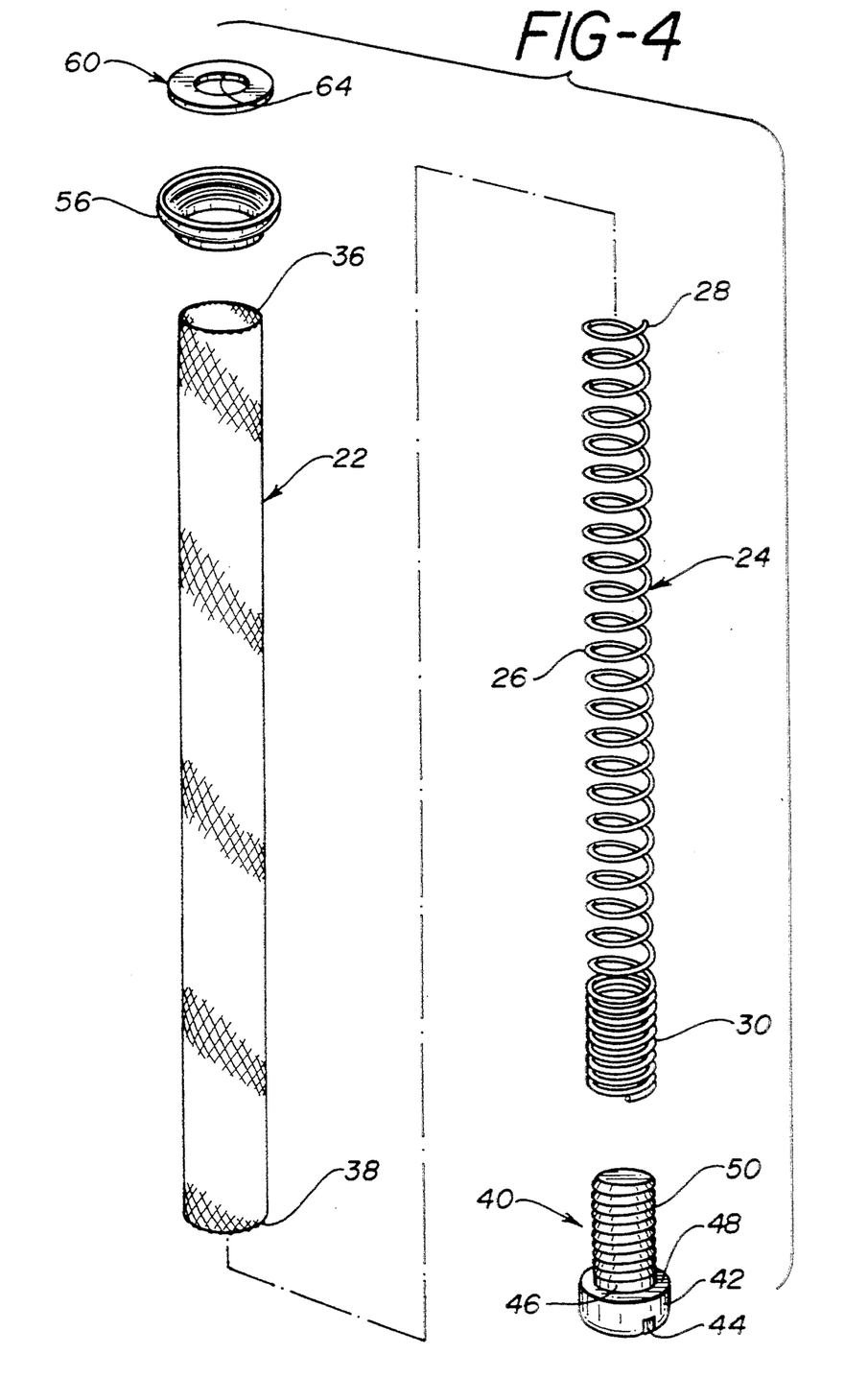
FIG. 4 is an exploded view of the device shown in FIG. 1.
Figure 5:
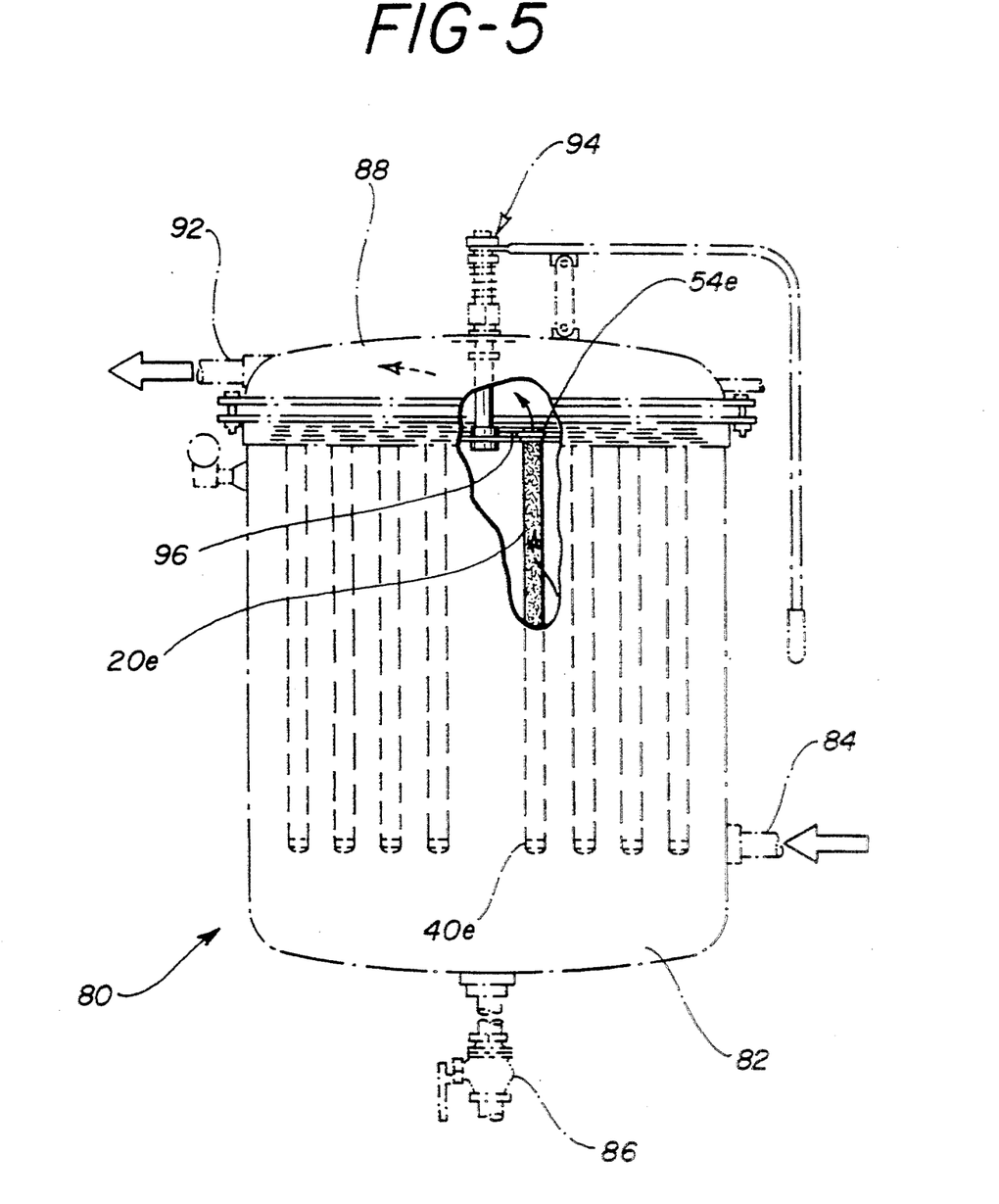
FIG. 5 is a phantom view, partially broken away, showing a filtering apparatus with an installed, recyclable flexible filter element similar to that shown in FIG. 1.

Referring now to FIG. 5, we show a filtering apparatus in which the recyclable flexible filter elements of the present invention can be installed. The apparatus generally indicated at 80 consists of a tank 82 having an inlet 84 and a drain 86 at the bottom. A top 88 is mounted on the tank and has an outlet 92 for filtered liquid. Agitating or "bump" mechanism 94 is mounted on the top of the filter and extends down to a tube sheet 96 separating the filtered from unfiltered sections of the filter. The recyclable flexible filter tube or filter element is generally indicated at 20e and is installed in the tube sheet by its flange portion 54e. As can be seen, the bottom sealing element 40e is located at the bottom of the filter element. The weight of the screw tends to assist the flexible filter element in its positioning within the filter apparatus during the flow of liquid which would tend to move the elements about.

Figure 6A:
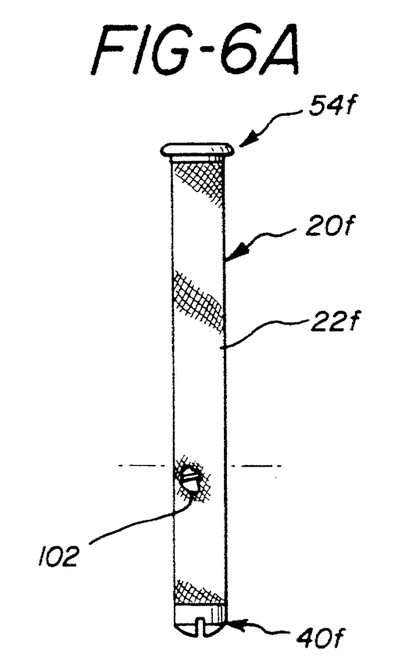
FIGS. 6(a) through 6(e) show a method for recycling a flexible filter element reusing the outer braided jacket.
Figure 6B:
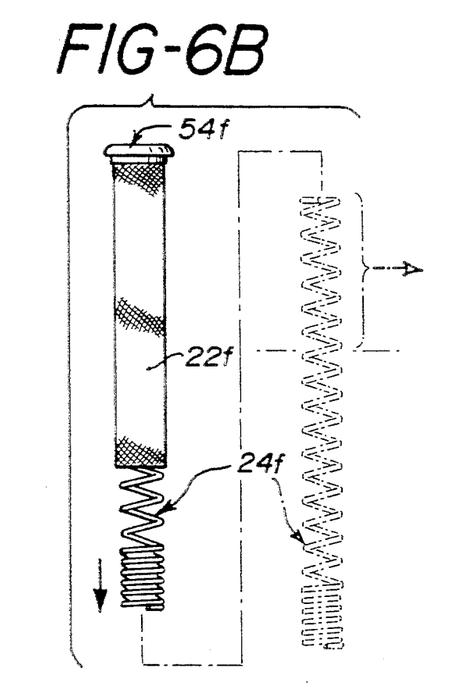
Figure 6C:
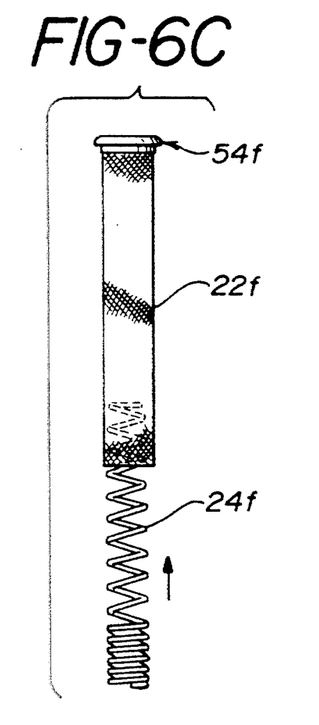
Figure 6D:
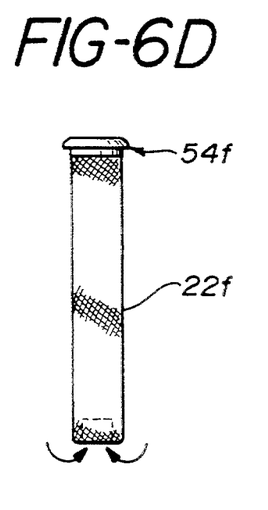
Figure 6E:
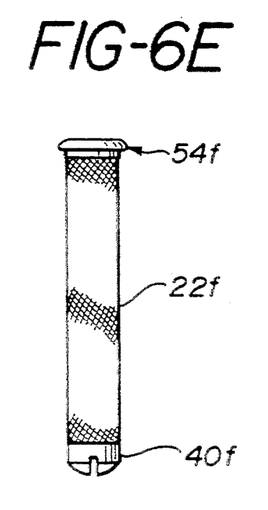
Figure 7A:
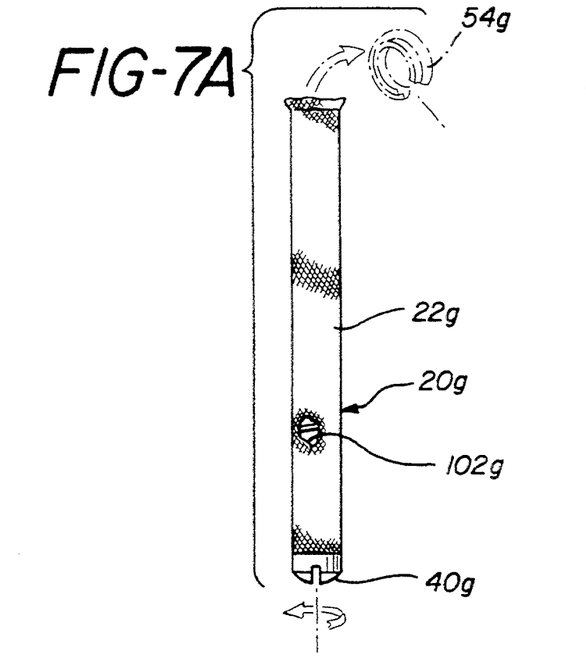
FIGS. 7(a) through 7(e) show a method for recycling a flexible filter element, the recycling utilizing a new, outer braided jacket.
Figure 7B:
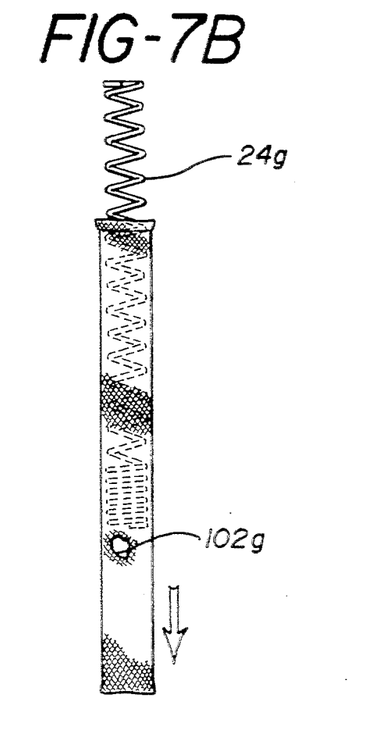
Figure 7C:
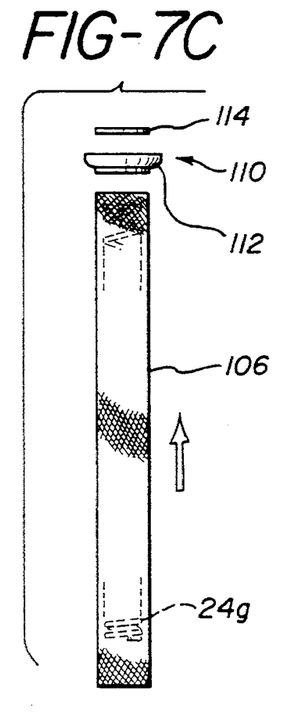
Figure 7D:
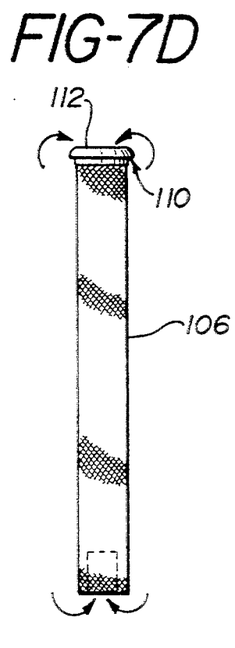
Figure 7E:
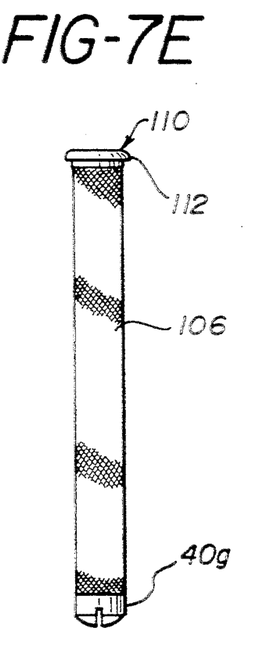

FIGS. 6a–6e show a method of recycling a flexible filter element on the present invention. It is shown in FIG. 6a the filter element generally indicated at 20f has a braided outer jacket 22f and a flange assembly 54f at the top of the filter element and a ceiling means 40f at the bottom. A hole 102 has been eroded in the braided outer jacket 22f.

This method involves unscrewing the screw 40f which is the sealing means at the bottom of the tube and then removing the spring 24f from the open tube. The tube is cut above the hole 102 and the top of the spring is cut a commensurate, or equal amount, as the amount of tubing that has been cut. The shortened spring is then replaced into the shortened tubular outer jacket shown in FIG. 6c, and the bottom of the outer jacket is folded under, and the screw is then reinserted to seal the refurbished filter tube.

Another method of recycling the filter tube is shown in FIGS. 7a–7e in which case the filter element generally indicated at has a hole 102g in the outer braided tubular jacket 22g, as was similarly the case. Here, the sealing screw 40g is unscrewed, and the flange assembly 54g is cut from the top of the tube, if necessary, and the braided tube 22g is removed from the spring. A new tube 106 of proper length is then provided, and the spring 24g is inserted into the tube 106. A new flange assembly 110, Consisting of a cupped outer member 112 and a new circular washer 114 is then attached to the top of the tubular braided outer jacket to seal the outer jacked to the ,flange assembly, the bottom of the outer jacket is turned under and inside the spring 24g, and the sealing screw 40g is then threaded in to seal the bottom of the tube.

FIG. 8 shows another embodiment of the sealing means that can be used to seal the bottom of the tubes. In this case it is an expansion plug, generally indicated at 120, which has a hemispherical head 122 with a pronounced shoulder 124 which would be used to contact the bottom of the braided jacket 22 where it would be turned under the spring 24.

An actuating plunger 128, which has a spreading end 132, is pushed inward to spread the expansion elements 126, so that they will engage the spring and hold the turned under end 132 of the tubular jacket 122 against the spring to prevent movement and thereby maintain a seal between the shoulder 124 and the bottom of the tube.

FIG. 9 shows another embodiment of a sealing means that could be used to seal the end of the tube. This is in the form of a spade bolt generally indicated at 135, which has a conical seal seating surface 136 and expansion elements 138 which are actuated by an actuating plunger 142 in the same manner as the expansion plug previously.

The actuating plunger 142 has a bore 144 through which a spring 146 is mounted. The spring will enable the bottom end of the tube to be restrained or positioned, so that the tubes can be used in other areas as, for example, leaf filters which are commonly used in the food industry. In this case, since the flexible tube is positioned firmly at both ends, it can be fastened to the manifolds that are typical of other filtering devices such as leaf filters. Since the flexible tubes of the present invention are relatively inexpensive, and the entire system of flexible tube filtration is relatively inexpensive in comparison to many other types of filtering systems, the ability to fix the position of the flexible tubes offers a great advantage for a wide variety of retrofits and/or applications into other areas.

As mentioned earlier, FIG. 10 shows, an embodiment of a flexible tube having a modified flange assembly. The filter tube generally indicated at 20j has a sealing end 40j as previously described and has an outer flange 56j also similar to that shown previously.

Figure 11:
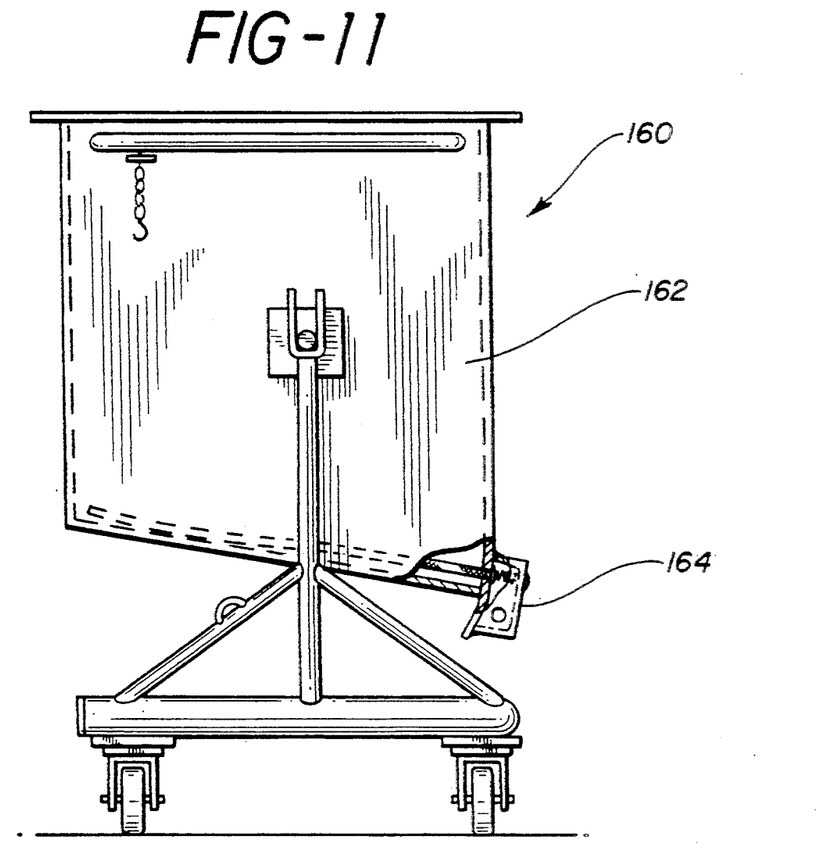
FIG. 11 shows a filter apparatus in which the tube shown in FIG. 10 would be installed.
Figure 12:
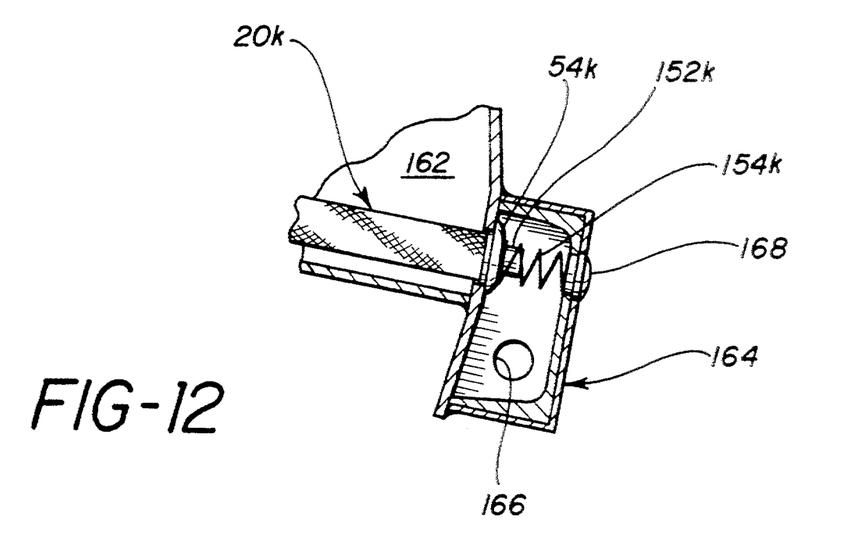
FIG. 12 is an enlarged fragmentary view of the filter element and filter apparatus shown in FIG. 12.

However, the inner washer 150 of the flange assembly 54j has an extended neck portion 152 which can be used to seat a spring 154 which can be used to mount this tube in a manifold as is shown in FIGS. 11 and 12. In FIG. 11, a vacuum sludge remover of the type shown in U.S. Pat. No. 4,340,477, issued to HOBSON, et al, which is incorporated herein by reference, is generally indicated at 160 and has a bin or tank section 160 and a manifold 164. As shown in FIG. 12, the manifold 64 has a series of positioning and access caps 168 mounted behind each of the filter element tubes, generally indicated as 20k. The neck of the tube 152k is used to seat the spring 154k against the inner portion of the positioning cap to force the flange 154k against the wall of the manifold to seal the unfiltered material in the bin 162 from the filtered material in the manifold. An outlet 166 is positioned in the manifold for removal of the filtered material.

It should be noted that, while we show a tubular section 152 extending from the flange in FIGS. 10, 11 and 12, there are many other methods of attaching the flange, such as to substitute a threaded portion with a pipe or other thread for the tubular portion 152, or a push and turn (Dzus-type) or other connection form.

It will be understood that various changes in the details, materials, arrangements of parts and operating conditions which have been described and illustrated in order to explain the nature of the invention, may be made by those skilled in the art within the principles and scope of this invention.

Having thus set forth the nature of the invention, what is claimed herein is:

1. A flexible filter element comprising:
   a porous outer tubular jacket having first and second ends;
   flexible internal helical spring means having first and second ends disposed within the outer tubular jacket for forming and supporting the outer tubular jacket, the second end of the internal spring means having successive closely wound helical windings spaced closer than the helical windings of the first end of the spring means;
   flange means sealably connected to the first end of the outer tubular jacket to seal the first end of the outer tubular jacket;
   retaining means on said flange means to retain the spring means at the first end of the outer tubular jacket; and
   sealing means at the second end of the outer tubular jacket to seal the second end of the outer tubular jacket, said sealing means comprising:
   a portion of said outer tubular jacket disposed within the second end of the internal spring means; and
   removable screw means coacting with the internal spring means to seal said portion of the outer tubular jacket disposed within the internal spring means.

2. The apparatus of claim 1, wherein the flange means comprises:
   a cylindrical entry portion;
   an enlarged section extending radially outward from the entry portion;
   an overlip curving radially back over the enlarged section; and
   the first end of the outer tubular jacket disposed within the flange means;
   washer means disposed within the first end of the outer jacket within said overlip to secure the first end of the outer tubular jacket about the washer means and within the flange means.

3. The apparatus of claim 2, wherein the removable screw means for removably attaching the outer tubular jacket within the closely wound helical winding of the helical spring comprises:
   a shank having threads formed thereon;
   wherein said portion of the outer tubular jacket is interposed between said threads and said closely wound helical windings such that said threads threadably engage said portion of the outer tubular jacket;
   a head; and
   a shoulder formed between said head and said shank of said screw means;
   said shoulder means contacting said outer tubular jacket at the second end of said helical spring to seal said outer tubular jacket.

4. A flexible filter element comprising:
   a porous outer tubular jacket having a first end and a second end;
   a flexible internal helical spring disposed within the outer tubular jacket for supporting the outer tubular jacket, the helical spring having first and second ends, the second end of the internal spring means having successive helical windings spaced closer together than the helical windings of the first end of the spring, the helical spring having a length less than the length of the outer tubular jacket; flange means attached to the first end of the outer tubular jacket to retain the first end of the helical spring; and
   sealing means coacting with the tightly wound helical winding at the second end of the helical spring for securing the second end of the outer tubular jacket to the second end of the helical spring, the sealing means comprising:
   the second end of the outer tubular jacket turned under the second end of the helical spring and disposed within the second end of the helical spring; and
   screw means for removably attaching the second end of the outer tubular jacket within the tightly wound helical winding of the helical spring.

5. The apparatus of claim 4 wherein the screw means for removably attaching the second end of the outer tubular jacket to the closely wound helical winding of the helical spring comprises a shank with threads formed thereon, the threads coacting with the closely wound helical winding of the helical spring to secure the second end of the outer tubular jacket between the threads of the shank of the screw and the closely wound helical winding of the helical spring.

6. The apparatus of claim 5, wherein the flange means comprises:
   a cylindrical entry portion;
   an enlarged section extending radially outward from the entry portion;
   an overlip curving radially back over the enlarged section; and the first end of the outer tubular jacket disposed within the flange means;

washer means disposed within the first end of the outer jacket within said overlip to secure the first end of the outer tubular jacket about the washer means and within the flange means.

7. A flexible filter element comprising:

a porous outer tubular jacket having first and second ends;

a flexible internal helical spring having first and second ends disposed within the outer tubular jacket for forming and supporting at least a portion of the outer tubular jacket, the second end of the internal spring having closely wound helical windings spaced closer together than the helical windings of the first end of the internal spring;

connecting means for sealably connecting the first end of the outer tubular jacket to the first end of the internal spring to seal the first end of the outer tubular jacket;

retaining means on the connecting means to retain the internal spring at the first end of the outer tubular jacket; and sealing means at the second end of the outer tubular jacket, the sealing means sealing the second end of the outer tubular jacket at the second end of the internal spring, the sealing means comprising:

the second end of the outer tubular jacket disposed within the second end of the internal spring; and removable screw means coacting with the second end of the internal spring to seal the second end of the outer tubular jacket disposed between the internal spring and the removable screw means.

8. The apparatus of claim 7, wherein the flange means comprises:

a cylindrical entry portion;

an enlarged section extending radially outward from the entry portion;

an overlip curving radially back over the enlarged section; and the first end of the outer tubular jacket disposed within the flange means;

washer means disposed within the first end of the outer jacket within said overlip to secure the first end of the outer tubular jacket about the washer means and within the flange means.

9. The apparatus of claim 8, wherein the removable screw means for removably attaching the outer tubular jacket to the closely wound helical winding of the helical spring comprises:

a shank having threads formed thereon;

wherein the second end of said outer tubular jacket is interposed between said shank threads and said closely wound helical windings such that said threads threadably engage the second end of the outer tubular jacket;

a head; and a shoulder formed between the shank and said head of said screw means;

said shoulder means contacting said outer tubular jacket at the second end of said helical spring to seal said outer tubular jacket.

* * * * *